US012303349B2

(12) United States Patent
Zhong et al.

(10) Patent No.: US 12,303,349 B2
(45) Date of Patent: May 20, 2025

(54) ORTHODONTIC APPLIANCE

(71) Applicant: GUANGZHOU OO MEDICAL SCIENTIFIC LIMITED, Guangdong (CN)

(72) Inventors: Tingjin Zhong, Guangdong (CN); Zien Xu, Guangdong (CN); Li Ji, Guangdong (CN); Wei Yu, Guangdong (CN)

(73) Assignee: GUANGZHOU OO MEDICAL SCIENTIFIC LIMITED, Guangdong (CN)

( * ) Notice: Subject to any disclaimer, the term of this patent is extended or adjusted under 35 U.S.C. 154(b) by 355 days.

(21) Appl. No.: 17/797,437

(22) PCT Filed: Mar. 5, 2021

(86) PCT No.: PCT/CN2021/079401
§ 371 (c)(1),
(2) Date: Aug. 4, 2022

(87) PCT Pub. No.: WO2021/175324
PCT Pub. Date: Sep. 10, 2021

(65) Prior Publication Data
US 2023/0067670 A1 Mar. 2, 2023

(30) Foreign Application Priority Data

Mar. 6, 2020 (CN) .......................... 202010151547.7

(51) Int. Cl.
*A61C 7/14* (2006.01)
(52) U.S. Cl.
CPC .................................... *A61C 7/141* (2013.01)
(58) Field of Classification Search
CPC ............ A61C 7/287; A61C 7/141; A61C 7/14
See application file for complete search history.

(56) References Cited

U.S. PATENT DOCUMENTS 5,466,151 A * 11/1995 Damon ................... A61C 7/287
433/10
7,416,408 B2 * 8/2008 Farzin-Nia ............. A61C 7/287
433/10
(Continued)

FOREIGN PATENT DOCUMENTS

CN       102238924      11/2011
CN       203234855      10/2013
(Continued)

OTHER PUBLICATIONS

"International Search Report (Form PCT/ISA/210) of PCT/CN2021/079401," mailed on Jun. 3, 2021, with English translation thereof, pp. 1-8.
(Continued)

Primary Examiner — Ralph A Lewis
(74) Attorney, Agent, or Firm — JCIPRNET

(57) ABSTRACT

An orthodontic appliance, includes a main body having an archwire groove and a movable part, and further includes a fixing structure for fixing the movable part at least in the closed position. The fixing structure includes an elastic member and a movable element which are located in one of the main body or the movable part. The movable element includes at least one protruding end, which is received in another of the main body and the movable part, the movable element cooperates with the elastic member to fix the movable part at least in the closed position, and the movable element acquires a moving space by squeezing the elastic member. During the opening and closing of the movable part, the wear-resistant movable element replaces the elastic element to cause friction with the movable part, which improves the wear resistance and service life of the appliance.

12 Claims, 11 Drawing Sheets

(56) References Cited

U.S. PATENT DOCUMENTS

| | | | | |
|---|---|---|---|---|
| 2007/0248928 | A1* | 10/2007 | Damon | A61C 7/287 |
| | | | | 433/10 |
| 2009/0325120 | A1* | 12/2009 | Lewis | A61C 7/287 |
| | | | | 433/13 |
| 2011/0318699 | A1* | 12/2011 | Forster | A61C 7/287 |
| | | | | 433/10 |
| 2013/0121626 | A1 | 5/2013 | Hsu et al. | |
| 2014/0223913 | A1* | 8/2014 | Fanella | B21D 53/84 |
| | | | | 29/889.22 |
| 2019/0117340 | A1* | 4/2019 | Oh | A61C 7/287 |
| 2019/0175306 | A1* | 6/2019 | Lai | A61C 7/14 |
| 2023/0067670 | A1* | 3/2023 | Zhong | A61C 7/287 |

FOREIGN PATENT DOCUMENTS

| | | |
|---|---|---|
| CN | 104822339 | 8/2015 |
| CN | 107476660 | 12/2017 |
| CN | 208017607 | 10/2018 |
| CN | 209004251 | 6/2019 |
| CN | 209122498 | 7/2019 |
| CN | 107714205 | 8/2019 |
| CN | 209884378 | 1/2020 |
| CN | 210019724 | 2/2020 |
| CN | 210749582 | 6/2020 |
| CN | 212547219 | 2/2021 |
| WO | 0057809 | 10/2000 |
| WO | 2016205716 | 12/2016 |
| WO | 2018005072 | 1/2018 |

OTHER PUBLICATIONS

"Written Opinion of the International Searching Authority (Form PCT/ISA/237) of PCT/CN2021/079401," mailed on Jun. 3, 2021, pp. 1-5.

\* cited by examiner

ORTHODONTIC APPLIANCE

CROSS-REFERENCE TO RELATED APPLICATION

This application is a 371 of international application of PCT application serial no. PCT/CN2021/079401, filed on Mar. 5, 2021, which claims the priority benefit of China application no. 202010151547.7, filed on Mar. 6, 2020. The entirety of each of the above-mentioned patent applications is hereby incorporated by reference herein and made a part of this specification.

BACKGROUND

Technical Field

The present disclosure relates to the technical field of orthodontic instrument, in particular to an orthodontic appliance.

Description of Related Art

At present, for dental or facial problems, such as crowded teeth, buck teeth, misaligned teeth, and malocclusion, orthodontists use orthodontic instruments to provide medical service to patients. Orthodontic appliances, such as brackets and buccal tubes, are the main components of the orthodontic therapeutic instruments. In conventional orthodontic treatment, the orthodontist attaches the brackets to the patient's teeth and disposes the archwire into the archwire groove of the bracket. The archwire applies the corrective force to the tooth through the bracket to move the tooth into the correct position. Earlier brackets retains the archwire in the archwire groove of each bracket with ligatures, while with movable parts, such as pins or sliders recently. At present, self-ligating brackets are common in the market, but the structure of the brackets still needs to be continuously modified to improve functionality, stability and reduce manufacturing cost.

Prior art CN107714205B and CN208017607U disclose a self-ligating orthodontic bracket. Most of the self-locking brackets in the market adopt a similar technical solution, that is, a recessed part is arranged on the main body to fix one end of the fixing member of the movable part in the recessed part, and the other end of the fixing member is received in the accommodating cavity on the movable part. The movement of the movable part is restricted by the elastic resilience of the fixing member. In this solution, on the one hand, the elastic member is in direct contact with the cover, repeatedly rubbing against the cover during the opening and closing of the cover. At present, the materials of the elastic member in the brackets, such as memory alloy, do not have ideal wear resistance. After opening and closing the cover for multiple times, the elastic member is severely worn, which may lead to problems such as unstable locking of the closing position of the cover or the cover being too easy to be opened.

The present disclosure aims to provide a more durable orthodontic appliance.

SUMMARY

In view of the above technical problems, the present disclosure provides a more durable orthodontic appliance.

The technical scheme adopted by the present disclosure to solve the technical problem is:

An orthodontic appliance includes a main body and a movable part, the main body has an archwire groove for accommodating an archwire, the movable part cooperates with the main body and is movable between an open position and a closed position relative to the main body, the orthodontic appliance further includes a fixing structure for fixing the movable part at least in a closed position, the fixing structure includes an elastic member and a movable element which are located in one of the main body or the movable part, the movable element includes at least one protruding end, which is received in another of the main body and the movable part, the movable element is movable by squeezing the elastic member and cooperates with the elastic member to fix the movable part at least in the closed position. In prior art CN107714205B, the elastic member is in direct contact with the cover, repeatedly rubbing against the cover during the opening and closing of the cover. At present, the materials of the elastic member in brackets, such as memory alloy, do not have ideal wear resistance. After opening and closing the cover for multiple times, the elastic member is severely worn, which may lead to problems such as unstable locking of the closing position of the cover or the cover being too easy to be opened. On the other hand, this type of solution simply restricts the movement of the movable part and position-limiting for self-locking by deforming the elastic shaft or the elastic body. The elasticity is defined by the elastic properties of the elastomer material itself. The elastic properties of the elastomer material is difficult to be adjusted. Therefore, the restriction of opening and closing the self-locking in CN107714205B and CN208017607U is difficult to be adjusted, which is likely to result in the cover of the self-locking bracket to be unstably closed or a larger force is required to open or close the cover, which makes it inconvenient for orthodontists to operate. In this solution, the rigid movable element is utilized in conjunction with the elastic member to restrict the movable part. It is the protruding end of the movable element that contacts and rubs against the movable part, and the rigid material has better wear resistance than that of the elastic material. Thus, the rigid material has less wear after rubbing against the movable part. In this manner, the movable part of the orthodontic appliance may still be stably fixed at the closed position after opening and closing for multiple times. Moreover, the elasticity of this solution may be defined by the structure of elastic member, but not simply by the elastic properties of the material itself. Thus, this solution may generate gentler elasticity. Meanwhile, the magnitude of restriction force for position locking of the movable part may also be fine-tuned and adjusted in terms of the specific shape, size, thickness, etc. of the elastic member.

In some specific embodiments, one of the movable part and the main body is provided with a blocking part. When the protruding end is in the first position, the blocking part abuts against the protruding end and suppresses the movable part from moving relative to the main body, the movable part is thus in the closed position and locked in the closed position. When the protruding end is in the second position, the movable part is movable relative to the main body, so as to arrive at the open position.

In some preferred embodiments, when the elastic member is not subject to any external force, the protruding end is located at the first position, and the movable element fixes the movable part in the closed position. When the movable part is in the closed position, the elastic member does not exert force. On the one hand, such configuration makes it convenient to assemble, such that the production efficiency is higher and the production cost is lower. On the other hand, when there is no external force to move the movable part, the elastic member will not exert force on the movable element to displace its position, the movable element may be stably located in situ, and the movable part may also be locked in the closed position more stably.

In some specific embodiments, the elastic member is retractable or expandable and cooperates with the movable element to fix the movable part at least in the closed position. The elastic member may meet the requirements as long as it provide a restoring force to the movable element to restore the movable element to its original position. The preferred solution is to adopt a spring-type elastic member, and the elastic member exerts elasticity by retracting and expanding. The elasticity may be defined by the structure of the elastic member, and may not simply rely on the elastic properties of the material itself. Therefore, the solution of the disclosure may provide gentler elasticity, and the magnitude of restriction force for the position locking of the movable part may also be fine-tuned and restricted by modifying the specific shape, size, thickness, etc. of the elastic member.

In other specific embodiments, the elastic member is bendable or straightened and cooperates with the movable element to fix the movable part at least in the closed position. The present disclosure also seeks protection for elastic members with some shapes which provide restoring force to the movable element by bending.

In some specific embodiments, the elastic member includes at least one abutment wall that abuts against a side wall of the movable element. The abutment wall presses against the movable element, and when the movable element is subject to any external force, the elastic member is squeezed and deformed. After the force on the movable element is removed, the restoring force of the elastic member provides a restoring force to the movable element. During the process of restoring the elastic member to its original shape, the movable element returns to the initial position. The number of the abutment walls may be one or two, and when the movable element is arranged in the middle of the elastic member, the elastic member may contain two abutment walls.

In other specific embodiments, the movable element is provided with a hole into which the elastic member is inserted. When the movable element is subject to any external force, the movable element drives the elastic member to deform. After removing the external force applied to the movable element, the restoring force of the elastic member is applied to the movable element. During the process of restoring the elastic member to its original shape, the movable element is restored to its initial position. In a further preferred embodiment, the hole is a through hole, and the elastic member passes through the through hole.

In some preferred embodiments, the movable element is movable and cooperates with the elastic member to fix the movable part at least in a closed position, and the elastic member is configured to provide the movable element with a moving space and a restoring force. The movable element may perform movement by moving or rotating, or a combination of moving and rotating.

In some preferred embodiments, the movable element is rotatable about an axis substantially parallel to a labial lingual direction or a maxilla gingival direction. The rotation direction of the movable element may be arbitrary. In a preferred embodiment, the movable element rotates along an axis substantially parallel to the labial lingual direction or the maxilla gingival direction.

In another specific embodiments, the fixing structure includes two elastic members located on either side of the movable element, and the elastic members are configured to provide the movable element with a moving space and a restoring force.

In some specific embodiments, the elastic member may be any one of an "N" shape, an "M" shape, a "π" shape, a "[" shape, a "C" shape, an "S" shape, an "L" shape, a "T" shape, a "U" shape, an "H" shape, a linear shape, and a polyline shape on a cross section substantially parallel to the labial lingual direction or the maxilla gingival direction. As long as the elastic member can be retracted and bent, it may be retracted or bent in the labial lingual direction, or in the maxilla gingival direction, all of which can provide the movable element with a moving space and a restoring force.

In some specific embodiments, the movable element is a plate or a pin. The movable element may also be formed in other shapes freely, such as plate or pin, with simple structure and lower cost.

In some specific embodiments, one of the movable part and the main body is provided with an accommodating cavity on a surface facing the movable element, and the protruding end of the movable element is accommodated in the accommodating cavity.

The present disclosure will be further described below with reference to the accompanying drawings and embodiments.

DESCRIPTION OF THE EMBODIMENTS

Figure 17:
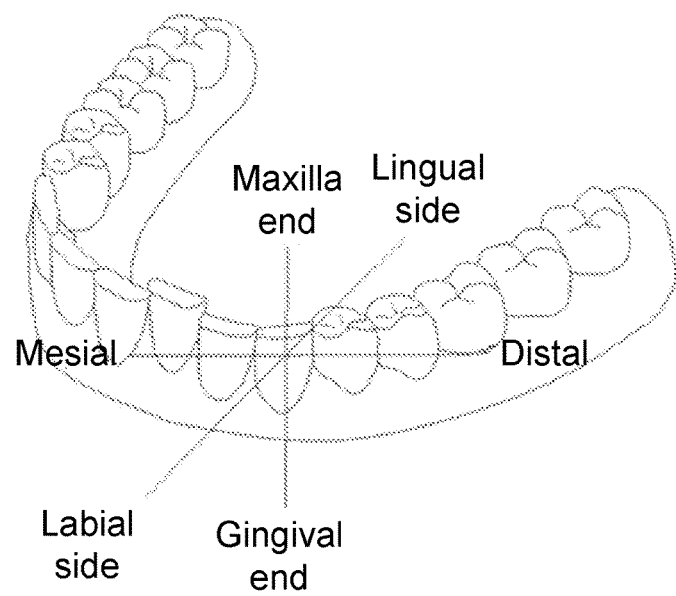
FIG. 17 is a schematic view of a tooth reference system.

In the following description of structure, it is necessary to use the reference system of the teeth to describe the orthodontic bracket, see FIG. 17 for specific illustration. The terminologies used herein to describe the orthodontic bracket such as labial, lingual, mesial, distal, occlusal, and gingival corresponding to the reference system of the teeth. However, embodiments of the present disclosure are not limited to the selected reference system and terminologies, as orthodontic brackets may be applied to on other teeth within the oral cavity and in other orientations. For example, an orthodontic bracket may also be bonded to the lingual surface of the teeth for use, which also falls within the scope of the present disclosure. Those skilled in the art will understand that when there is a change in the reference system, the reference system may not be directly applied to the descriptive terminology used herein. However, embodiments of the present disclosure are intended to be independent of position and orientation within the oral cavity, and the relative terms used to describe the embodiments are merely to provide clarity to the embodiments in the accompanying drawings. Likewise, the related terms such as labial, lingual, mesial, distal, occlusal and gingival in no way limit the disclosure to a particular location or orientation.

It should be noted that the related terms, such as labial side, lingual side, mesial, distal, maxillary plane and gingiva, are terminologies used for orthodontic treatment. Hereinafter the mandibular teeth are taken as an example. The surface of the orthodontic bracket may be substantially divided into six surfaces. The surface facing the lips is the labial surface of the orthodontic bracket, and the surface facing the tongue is the lingual surface of the orthodontic bracket. The labial surface and lingual surface are opposite to each other. The direction in which the labial surface and lingual surface are formed is also called the labial lingual direction. The occlusal surface facing the maxillary teeth is the occlusal surface of the orthodontic bracket, which may also be called the maxillary plane and the maxillary surface. The surface of the gingival tissue facing the tooth attached thereto is the gingival surface of the orthodontic bracket. The occlusal surface and the gingival surface are opposite to each other, and the direction in which the occlusal surface and the gingival surface are formed is also called the maxilla gingival direction. The surface of the tooth facing the tooth midline is the mesial surface, the surface opposite to the mesial surface is called the distal surface, and the direction in which the mesial surface and the distal surface are formed is called the mesiodistal direction.

In the description of the direction, for example, the labial lingual direction generally refers to a bidirectional direction. As to the labial-lingual direction, it refers to a unidirectional direction, that is, the direction from the labial side to the lingual side. The above two directions are distinguished by whether or not a short horizontal line is added between the term describing the direction.

The axis inclination marking line refers to an inclined line set on the orthodontic bracket with the same inclination angle as the bracket axis, which is used for more precise positioning when the doctor attaches the bracket to the tooth surface.

Furthermore, the components and spaces described below are also described with reference to the reference system of the mandibular teeth, such as the gingival direction and the maxillary surface of a certain component, which should not be construed as a limitation to the component and space.

The First Embodiment

Figure 1:
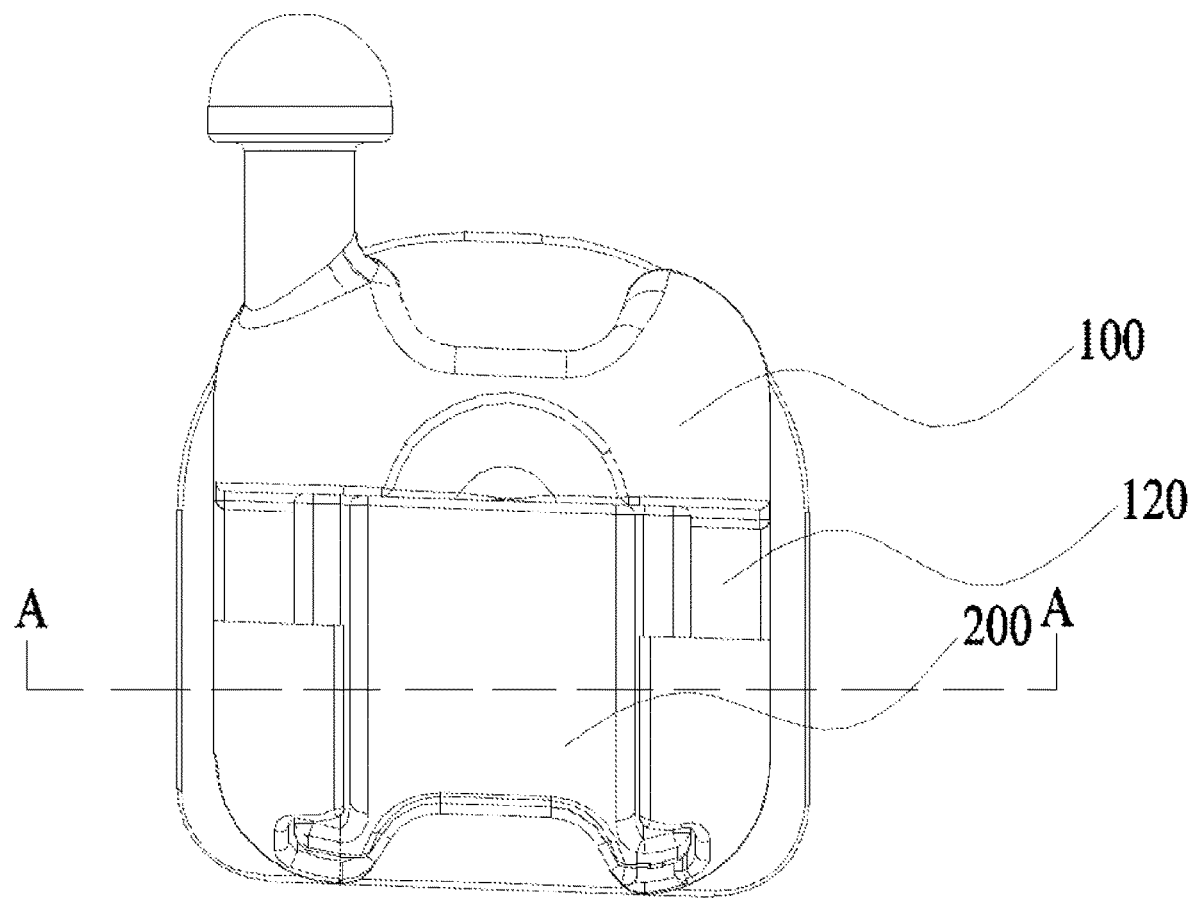
FIG. 1 is a front view of an orthodontic appliance of the first embodiment.
Figure 2:
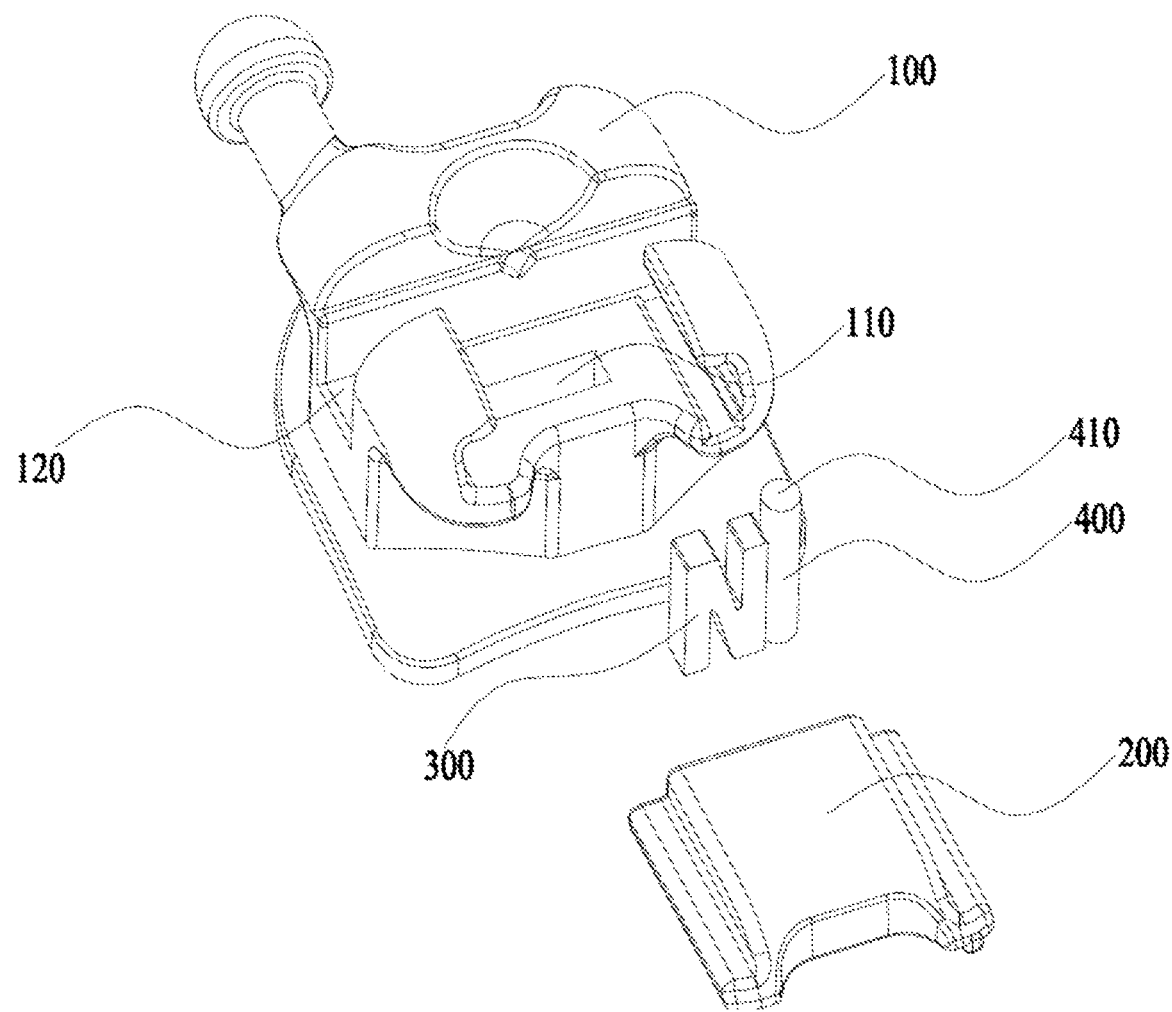
FIG. 2 is an exploded structural view of the orthodontic appliance of the first embodiment.
Figure 3:
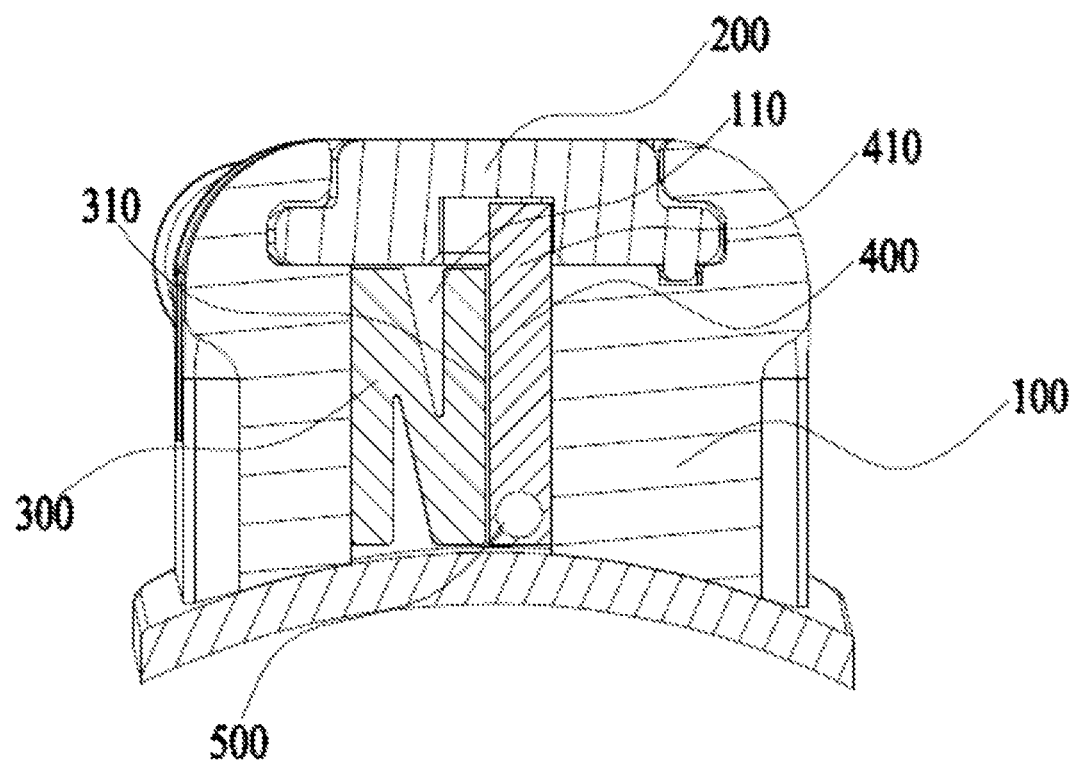
FIG. 3 is a cross-sectional view of the orthodontic appliance in the closed position taken along the section A-A of FIG. 1.

Referring to FIG. 1 to FIG. 3, FIG. 1 is a front view of an orthodontic appliance of the first embodiment. FIG. 2 is an exploded structural view of the orthodontic appliance of the first embodiment. FIG. 3 is a cross-sectional view of the orthodontic appliance in the closed state taken along the section A-A of FIG. 1. The present embodiment provides an orthodontic appliance, including a main body 100 and a movable part 200. The main body 100 has an archwire groove 120 for accommodating an archwire. The movable part 200 cooperates with the main body 100 and is movable between the open position and the closed position relative to the main body 100. The orthodontic appliance further includes a fixing structure for fixing the movable part 200 at least in the closed position. The fixing structure includes an elastic member 300 and a movable element 400 located in one of the main body 100 and the movable part 200. In this embodiment, the movable part 200 is a locking slider. In other embodiments, the movable part may also be other structures such as clamps. The elastic member 300 and the movable element 400 are provided on the main body 100, the main body 100 is provided with a recessed part 110, and the elastic member 300 and the movable element 400 are provided in the recessed part 110. The orthodontic appliance may be a bracket or may be a buccal tube. The movable element 400 includes at least one protruding end 410 accommodated in the other of the main body 100 and the movable part 200. In this embodiment, the protruding end 410 is accommodated in the movable part 200. The movable element 400 is rotatable and cooperates with the elastic member 300 to fix the movable part 200 at least in a closed position. The movable element 400 obtains a moving space and a restoring force by squeezing the elastic member 300.

In prior art CN107714205B, the elastic member is in direct contact with the cover, repeatedly rubbing against the cover during the opening and closing of the cover. At present, the materials of the elastic member in brackets, such as memory alloy, do not have ideal wear resistance. After opening and closing the cover for multiple times, the elastic member is severely worn, which may lead to problems such as unstable locking of the closing position of the cover or the cover being too easy to be opened. On the other hand, this type of solution simply restricts the movement of the movable part and position-limiting for self-locking by deforming the elastic shaft or the elastic body. The elasticity is defined by the elastic properties of the elastomer material itself. The elastic properties of the elastomer material is difficult to be adjusted. Therefore, the restriction of opening and closing the self-locking in CN107714205B and CN208017607U is difficult to be adjusted, which is likely to result in the cover of the self-locking bracket to be unstably closed or a larger force is required to open or close the cover, which makes it inconvenient for orthodontists to operate. In this solution, the rigid movable element 400 is utilized in conjunction with the elastic member 300 to restrict the movable part 200. It is the protruding end 410 of the movable element 400 that contacts and rubs against the movable part 200, and the rigid material has better wear resistance than that of the elastic material. Thus, the rigid material has less wear after rubbing against the movable part 200. In this manner, the movable part 200 of the orthodontic appliance may still be stably fixed at the closed position after opening and closing for multiple times.

Referring to FIG. 3 to FIG. 6, the movable element 400 is connected with the main body 100 through the axis 500. The movable element 400 is rotatable about the axis 500 and cooperates with the elastic member 300 to fix the movable part 200 at least in the closed position. The elastic member 300 is configured to provide the movable element 400 with a moving space and a restoring force. The movable element may perform movement by moving or rotating, or a combination of moving and rotating. Specifically, the movable element 400 is rotatable about an axis substantially parallel to the maxilla gingival direction. The rotation direction of the movable element 400 may be arbitrary, and may also be rotated along an axis substantially parallel to the labial tongue direction. In other embodiments, the movable element 400 may not be fixedly connected with the main body 100, and may be directly placed into the recessed part 110.

In the present embodiment, the elastic member 300 is retractable or expandable and cooperates with the movable element 400 to fix the movable part 200 at least in the closed position. A spring-type elastic member 300 is adopted, and the elastic member 300 generates elasticity by retracting and expanding. The elasticity may be defined by the structure of the elastic member 300, and may not simply rely on the elastic properties of the material itself. Therefore, the solution of the disclosure may provide gentler elasticity, and the magnitude of restriction force for the position locking of the movable part 200 may also be fine-tuned and restricted by modifying the specific shape, size, thickness, etc. of the elastic member 300. The elastic member 300 may be any one of an "N" shape, an "M" shape, a "π" shape, a "[" _shape, a "C" shape, an "S" shape, an "L" shape, a "T" shape, a "U" shape, an "H" shape, a linear shape, and a polyline shape on a cross section substantially parallel to the labial lingual direction or the maxilla gingival direction. In this embodiment, the cross-section of the elastic member 300 in the labial lingual direction is an "N" shape. As long as the elastic member 300 can be retracted and bent, it may be retracted or bent in the labial lingual direction, or in the maxilla gingival direction, all of which can provide the movable element 400 with a moving space and a restoring force.

Figure 4:
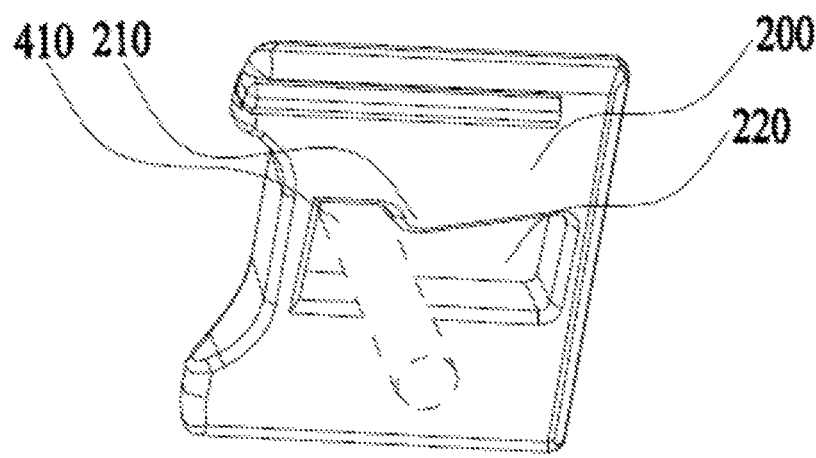
FIG. 4 is a schematic structural view of the movable part when the orthodontic appliance is in the closed position.

Referring to FIG. 3 to FIG. 4, FIG. 3 is a cross-sectional view of the orthodontic appliance in the closed state taken along the section A-A of FIG. 1. FIG. 4 is a schematic structural view of the movable part when the orthodontic appliance is in the closed state. One of the movable part 200 and the main body 100 is provided with a blocking part 210, and the protruding end of the movable element is accommodated in the accommodating cavity. In this embodiment, the movable element 400 and the elastic member 300 are provided on the main body 100, and the blocking part 210 is provided on the movable part 200. In this embodiment, the movable part 200 is provided with an accommodating cavity 220 on the surface of the movable part 200 facing the movable element 400, and the blocking part 210 is provided on the side wall of the accommodating cavity 220. The blocking part 210 is a protruding structure. In other embodiments, the blocking part 210 may also be any other structure, and the accommodating cavity 220 may also be a through hole or other alternative structures. In FIG. 3 to FIG. 4, the protruding end 410 is in the first position, and the blocking part 210 abuts against the protruding end 410 and suppresses the movable part 200 from moving relative to the main body 100. Under the circumstances, the movable part 200 is in the closed position, and the blocking part 210 suppresses the movable part 200 from moving, that is, the movable part 200 is locked in the closed position. Under the circumstances, the elastic member 300 is not subject to any external force, that is, in the state of no deformation. When the movable part 200 is in the closed position, the elastic member 300 does not exert any force. On the one hand, such design is convenient for assembly and makes the production efficiency higher, and the production cost is lower. On the other hand, when there is no external force to move the movable part 200, the elastic member 300 will not exert force on the movable element 400 to displace its position, and the movable element 400 may be stably located in situ. The movable part 200 may also be locked in the closed position more stably.

The elastic member 300 includes at least one abutment wall 310, abutting against the side wall of the movable element 400. When the movable element 400 is subject to a force to move or rotate, the movable element 400 squeezes the elastic member 300 to deform. After the force to the movable element 400 is removed, the restoring force of the elastic member 300 provides a restoring force for the movable element 400. During the process of restoring the elastic member 300 to the original shape, the movable element 400 returns to the initial position. The number of the abutment walls 310 may be one or two or more. In this embodiment, the elastic member 300 includes one abutment wall 310.

The simpler the structure of a component, the lower the production cost. The movable element 400 may be made in form of a plate or pin, such that the production cost is lower. The movable element 400 may also be made into any other shape. In this embodiment, the movable element 400 is a cylindrical pin.

Figure 5:
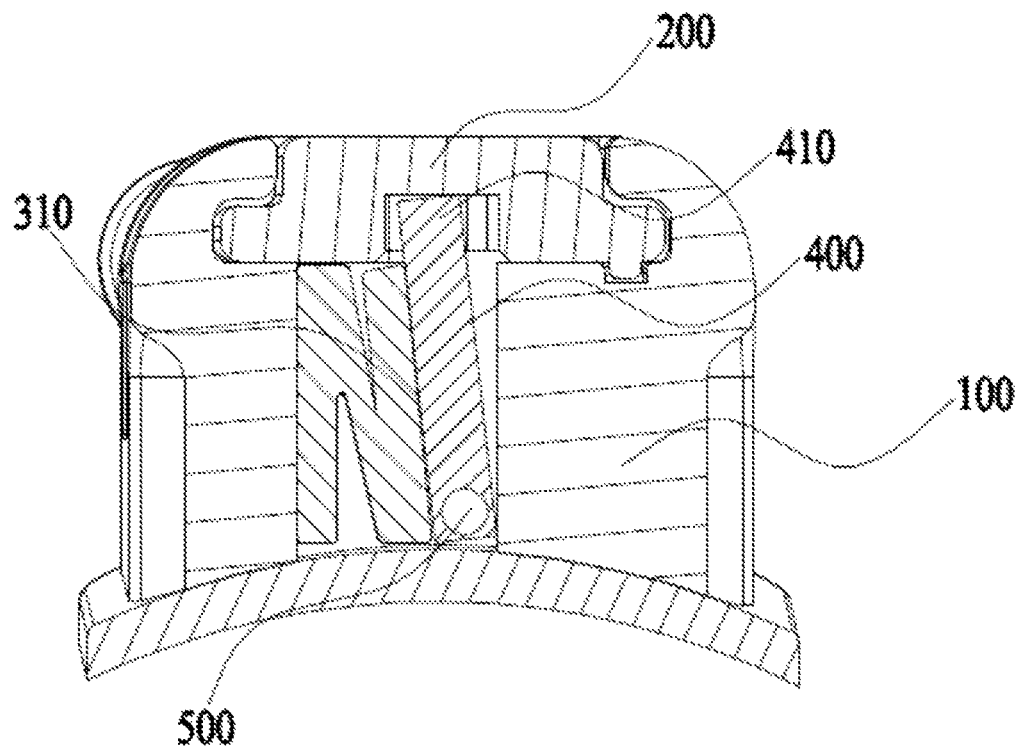
FIG. 5 is a cross-sectional view of the orthodontic appliance in an open position taken along the section A-A in FIG. 1.
Figure 6:
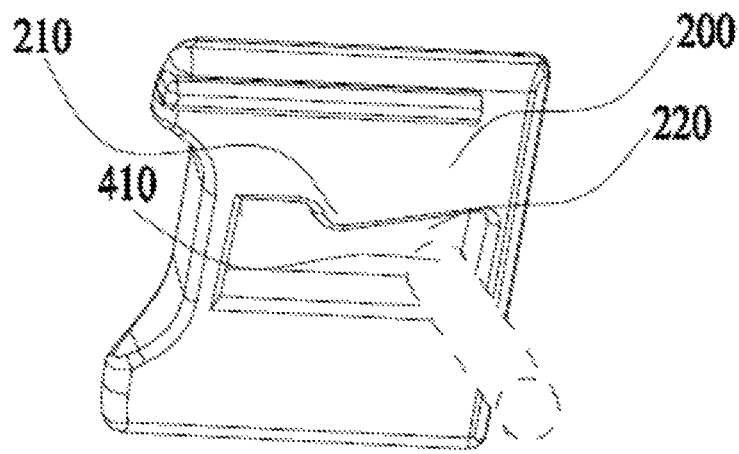
FIG. 6 is a schematic structural view of the movable part when the orthodontic appliance is in an open position.

Referring to FIG. 5 to FIG. 6, FIG. 5 is a cross-sectional view of the orthodontic appliance in an open state taken along the section A-A in FIG. 1. FIG. 6 is a schematic structural view of the movable part of the orthodontic appliance in a movable state. The protruding end 410 in FIG. 5 to FIG. 6 is in the second position, the movable part 200 is movable relative to the main body 100, and the movable part 200 is movable to arrive at the open position. When the movable part 200 is moved to the open position, the side wall of the accommodating cavity 220 may suppress the protruding end 410 from sliding out, thereby preventing the movable part 200 from sliding off the main body 100.

The Second Embodiment

Figure 7:
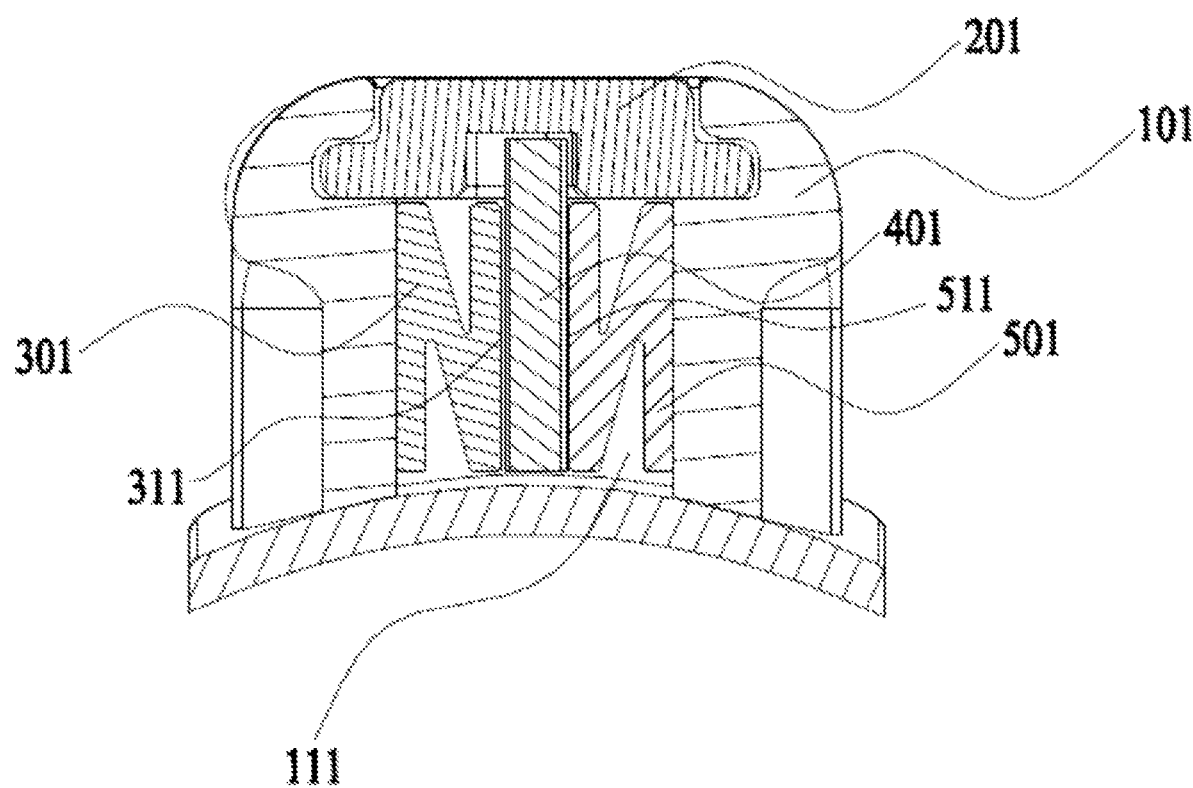
FIG. 7 is a cross-sectional view of the orthodontic appliance of the second embodiment.
Figure 8:
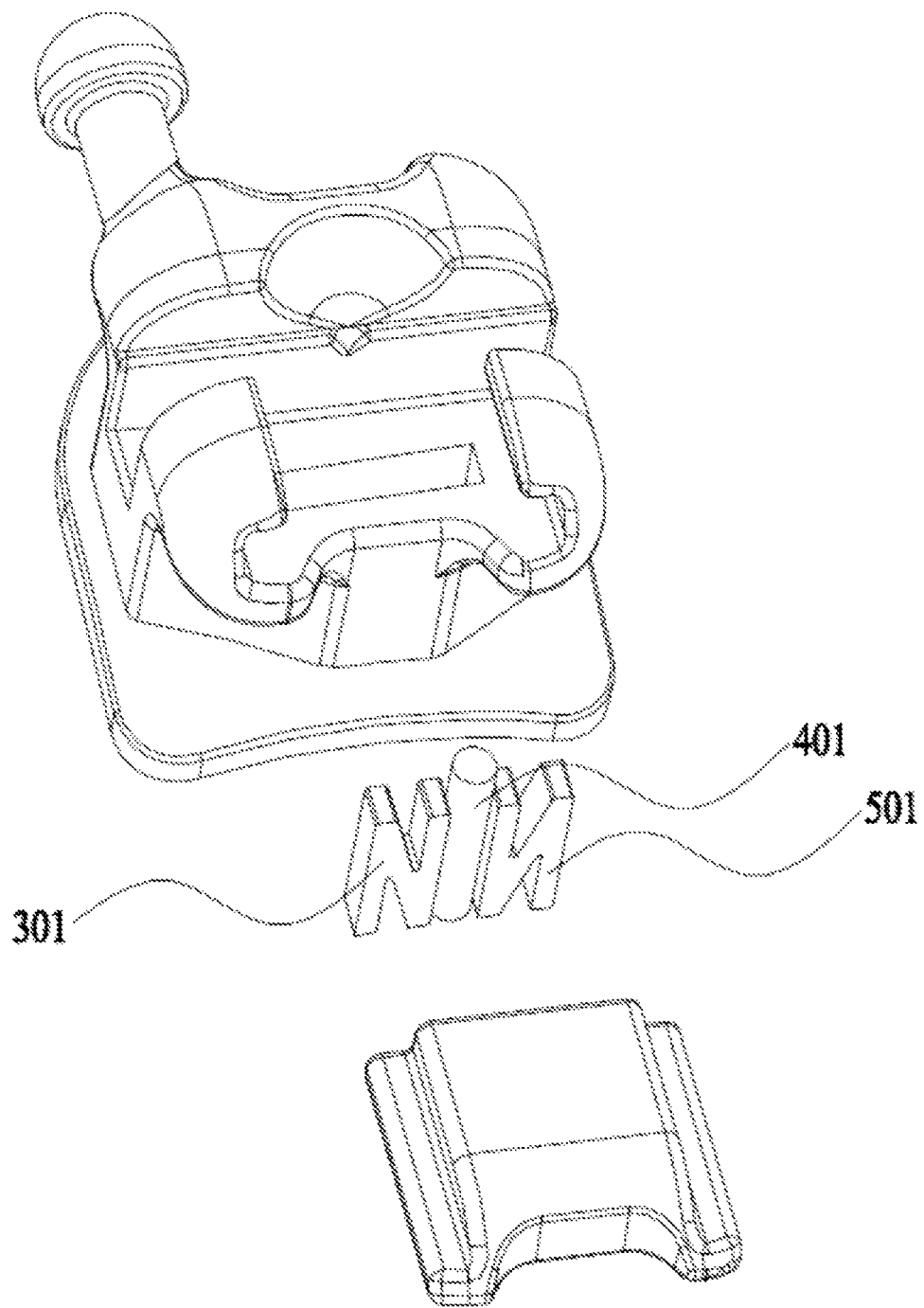
FIG. 8 is an exploded structural view of the orthodontic appliance of the second embodiment.

Referring to FIG. 7 to FIG. 8, FIG. 7 is a cross-sectional view of the orthodontic appliance of the second embodiment. FIG. 8 is an exploded structural view of the orthodontic appliance of the second embodiment. This embodiment provides an orthodontic appliance whose structure is substantially the same as that of the first embodiment. The difference lies in that, in some specific embodiments, the fixing structure includes two elastic members 301 and 501 located on either side of the movable element 401, the elastic members 301 and 501 are configured to provide the movable element 401 with a moving space and a restoring force. The two elastic members 301 and 501 have abutment walls 311 and 511, which respectively abut against either side of the movable element 401. In FIG. 7, the movable part 201 is in the closed position. Under the circumstances, the elastic members 301 and 501 are both not subject to a force, the movable element 401 is not fixedly connected with the main body 101, and the movable element 401 is removably placed in the recess part 111. When the movable part 201 is pushed by a force, the movable part 201 squeezes the movable element 401 and thus the elastic member 301, and then the movable element 401 rotates, thereby allowing the movable part 201 to move.

The Third Embodiment

This embodiment provides an orthodontic appliance which is substantially the same as the orthodontic appliance in the second embodiment, and its structural diagram is exactly the same as that in the second embodiment. The difference lies in that, in the state shown in FIG. 7, the movable part 201 is in the closed position. Under the circumstances, the elastic members 301 and 501 are both subject to an external force. When the movable part 201 is pushed by the force, the movable part 201 squeezes the movable element 401 and thus the elastic member 301, and then the movable element 401 performs movement, and the movement is performed in the combination of moving and rotating, thereby allowing the movable part 201 to move.

The Fourth Embodiment

Figure 9:
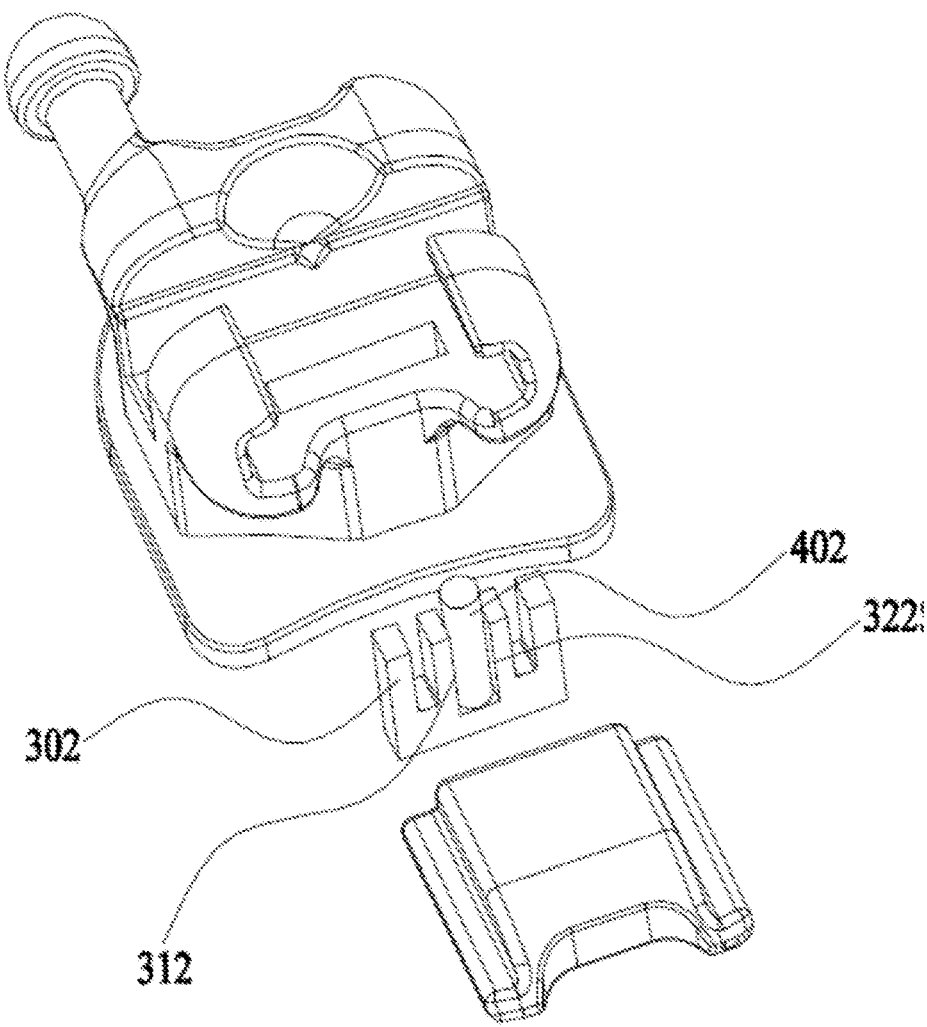
FIG. 9 is an exploded structural view of the orthodontic appliance of the fourth embodiment.

Referring to FIG. 9, FIG. 9 is an exploded structural view of the orthodontic appliance of the fourth embodiment. This embodiment provides an orthodontic appliance whose structure is substantially the same as that of the first embodiment. The difference lies in that the elastic member 302 has two abutment walls 312 and 322, and the abutment walls 312 and 322 respectively abut against the side walls on either side of the movable element 402. The cross-section of the elastic member 302 in the labial lingual direction includes two "[" shapes.

The Fifth Embodiment

Figure 10:
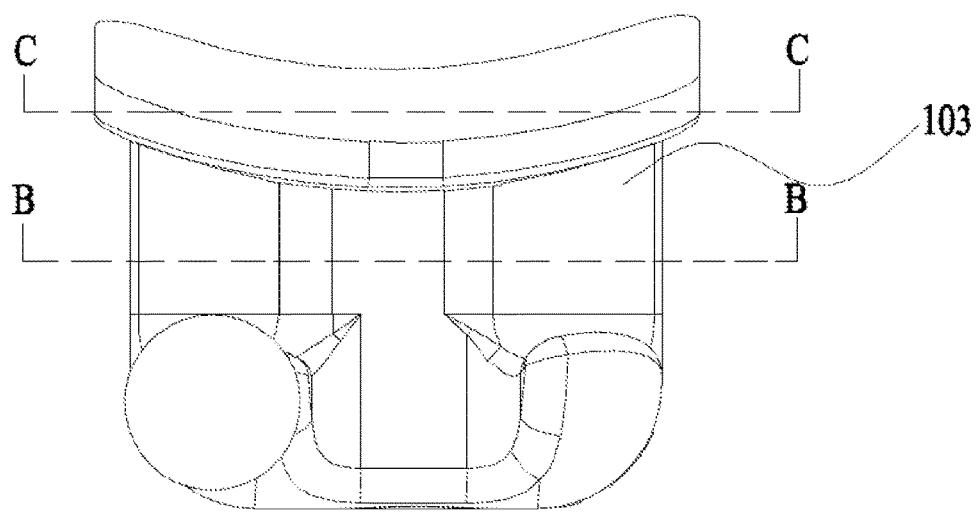
FIG. 10 is a top view of the orthodontic appliance of the fifth embodiment.
Figure 11:
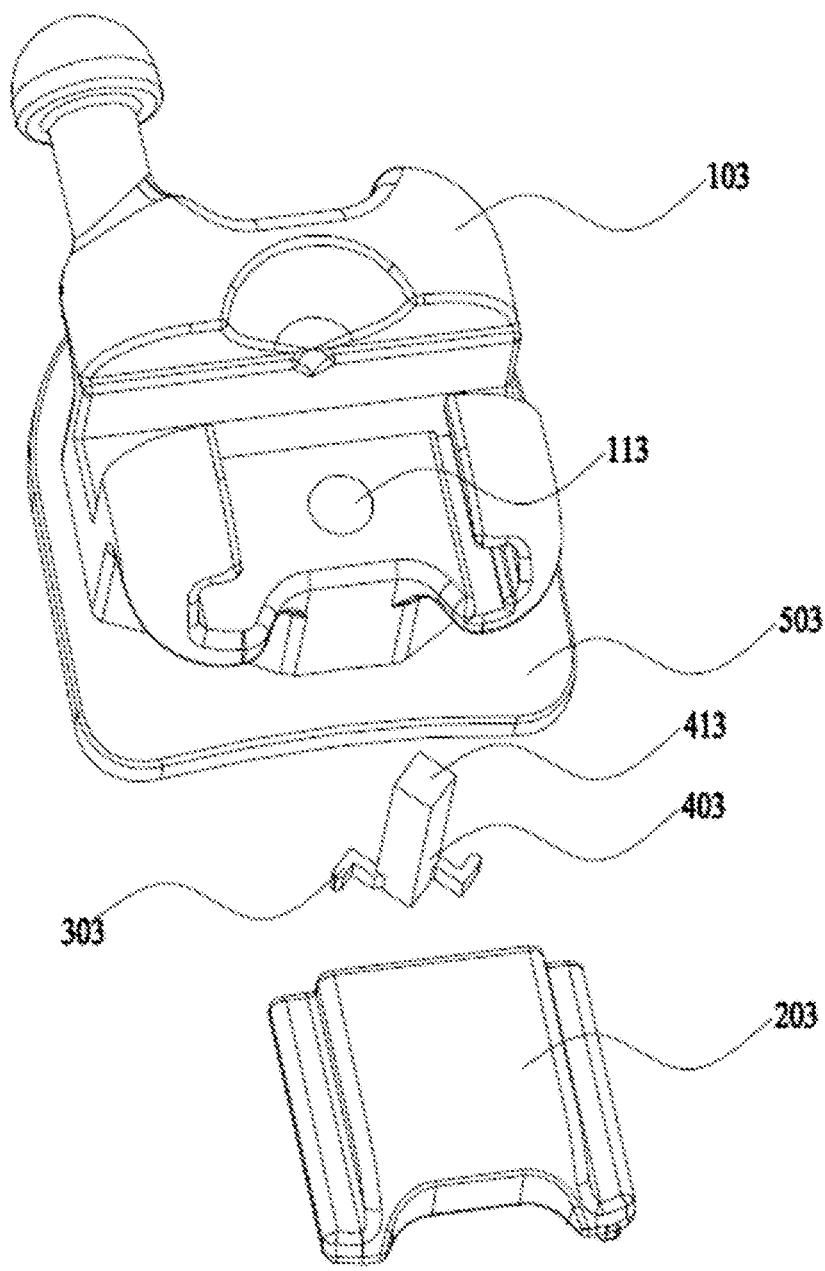
FIG. 11 is an exploded structural view of the orthodontic appliance of the fifth embodiment.
Figure 12:
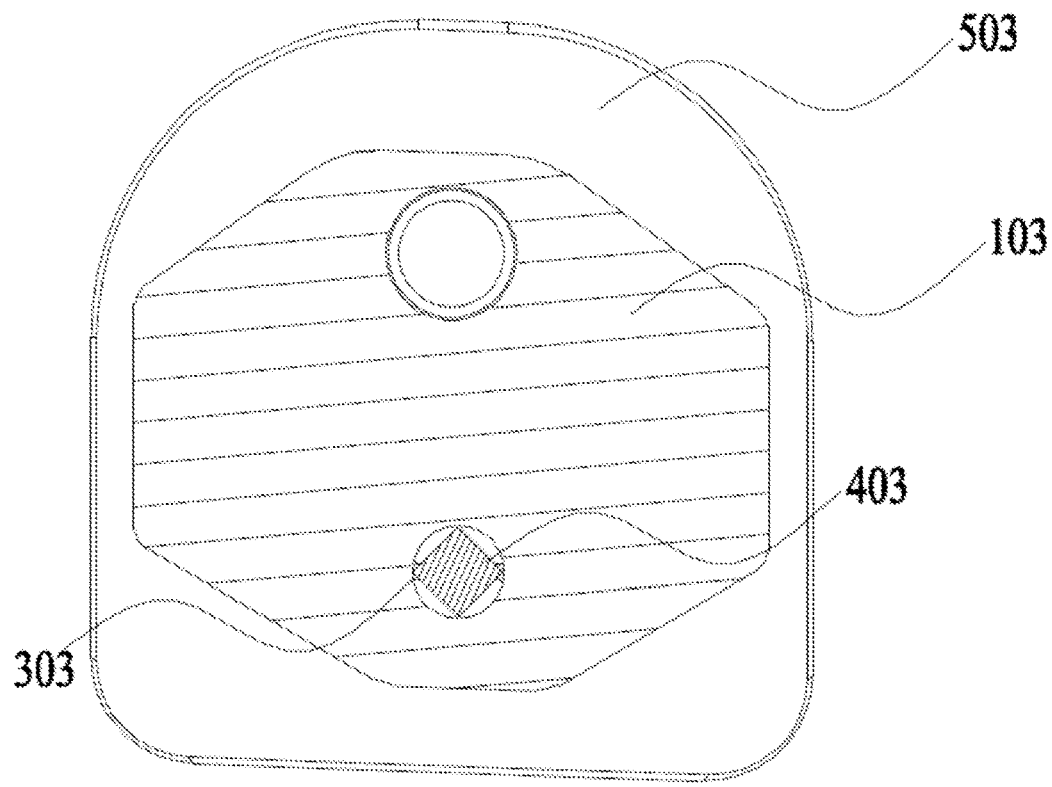
FIG. 12 is a cross-sectional view of the orthodontic appliance in a closed position taken along the section B-B in FIG. 10.
Figure 13:
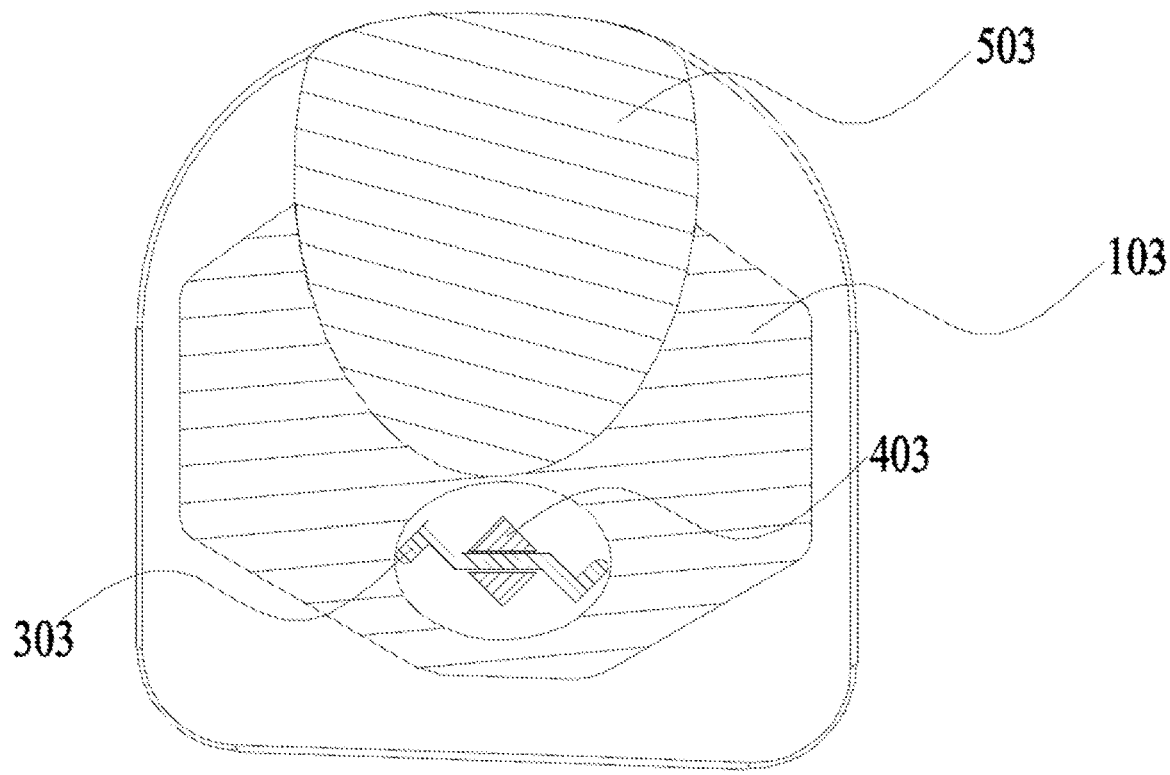
FIG. 13 is a cross-sectional view of the orthodontic appliance in a closed position taken along the section C-C in FIG. 10.

Referring to FIG. 10 to FIG. 13, FIG. 10 is a top view of the orthodontic appliance of the fifth embodiment. FIG. 11 is an exploded structural view of the orthodontic appliance of the fifth embodiment. FIG. 12 is a cross-sectional view of the orthodontic appliance in a closed state taken along the section B-B in FIG. 10. FIG. 13 is a cross-sectional view of the orthodontic appliance in a closed state taken along the section C-C in FIG. 10. This embodiment provides an orthodontic appliance. The front view of the orthodontic appliance is the same as the front view of the orthodontic appliance in the first embodiment. The orthodontic appliance includes a main body 103, a bottom plate 503 and a movable part 203. The bottom plate 503 is configured to be attached to the patient's teeth. The movable part 203 cooperates with the main body 103 and is movable between an open position and a closed position relative to the main body 103. The orthodontic appliance further includes a fixing structure configured to fix the movable part 203 at least in a closed position. The fixing structure includes an elastic member 303 and a movable element 403 located in the main body 103. The main body 103 is provided with a recessed part 113, and the elastic member 303 and the movable element 403 are provided in the recessed part 113. The movable element 403 includes at least one protruding end 413, one of which is accommodated in the movable part 203. The movable element 403 is rotatable and cooperates with the elastic member 303 to fix the movable part 203 at least in the closed position, and the elastic member 303 is bendable and cooperates with the movable element 403 to fix the movable part 203 at least in the closed position.

The movable element 403 is provided with a hole into which the elastic member 303 is inserted. When the movable element 403 is subject to any external force to move or rotate, the movable element 403 drives the elastic member 303 to bend and deform, or to expand. After the force on the movable element 403 is removed, the restoring force of the elastic member 303 provides a restoring force for the movable element 403. During the process of restoring the elastic member 303 to its original shape, the movable element 403 returns to the initial position. In this embodiment, the hole is a through hole through which the elastic member 303 passes. The cross-section of the elastic member 303 in the maxilla gingival direction is a polyline shape, and in other embodiments, the elastic member 303 may also be a linear shape. Compared with the linear elastic member, the elasticity of the polyline elastic member may be defined by the structure of the elastic member, and may not rely solely on the elastic properties of the material itself, thereby generating gentler elasticity. Moreover, the magnitude of restriction force for position locking of the movable part 203 may also be fine-tuned and restricted by modifying the specific shape, size, thickness, etc. of the elastic member 303.

Figure 14:
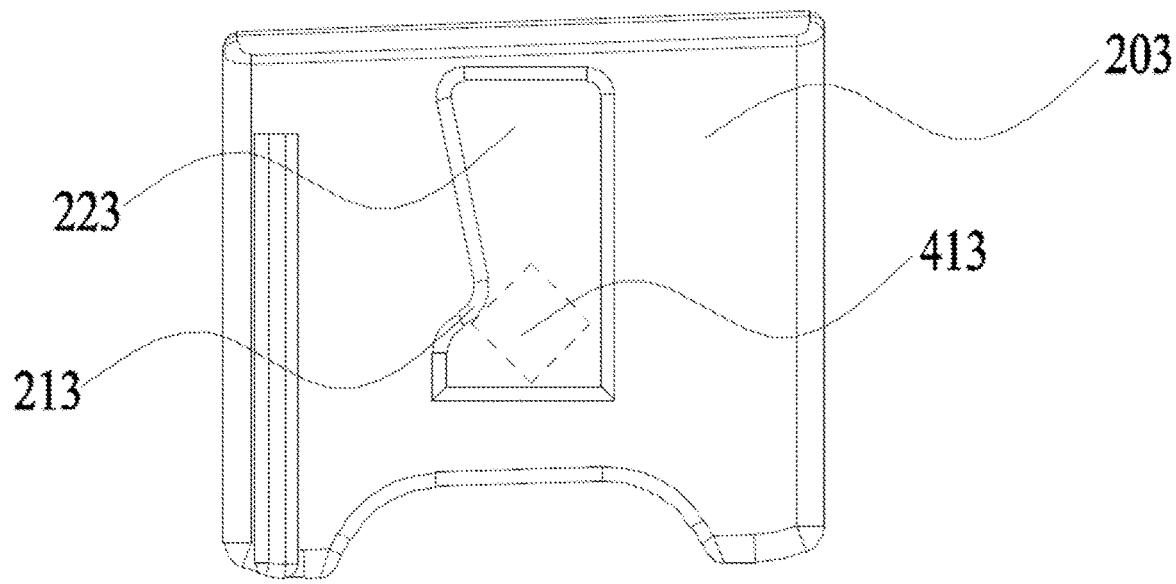
FIG. 14 is a rear view of the movable part when the orthodontic appliance is in the closed position.

Referring to FIG. 13 to FIG. 14, FIG. 13 is a cross-sectional view of the orthodontic appliance in a closed state taken along the section C-C in FIG. 10. FIG. 14 is a rear view of the movable part when the orthodontic appliance is in the closed state. A surface of the movable part 203 facing the movable element 403 is provided with an accommodating cavity 223, a side wall of the accommodating cavity 223 is provided with a blocking part 213, and the protruding end 413 of the movable element 403 is accommodated in the accommodating cavity 223. In FIG. 13 to FIG. 14, the protruding end 413 is in the first position. Under the circumstances, the blocking part 213 abuts against the protruding end 413 and suppresses the movable part 203 from moving relative to the main body 103. Under the circumstances, the movable part 203 is in the closed position, and the blocking part 213 suppresses the movable part 203 from moving, that is, the movable part 203 is locked in the closed position. Under the circumstances, the elastic member 303 is not subject to any external force, that is, in the state of no deformation. When the movable part 203 is in the closed position, the elastic member 303 does not exert any force. On the one hand, such design facilitates the assembly and makes the production efficiency higher, and the production cost is lower. On the other hand, when there is no external force to move the movable part 203, the elastic member 303 will not exert force on the movable element 403 to displace its position, and the movable element 403 may be stably located in this position. The movable part 203 may also be locked in the closed position more stably.

The simpler the structure of a component, the lower the production cost. In this embodiment, the movable element 400 is a square pin, and the production cost is low.

Figure 15:
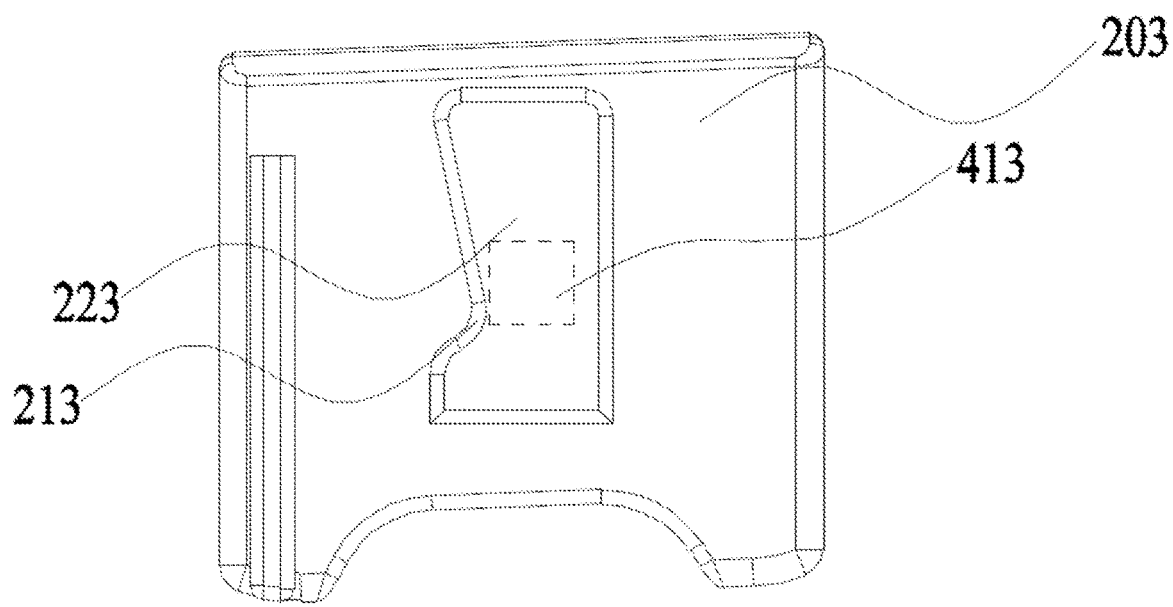
FIG. 15 is a cross-sectional view of the orthodontic appliance in an open position taken along the section C-C in FIG. 10.
Figure 16:
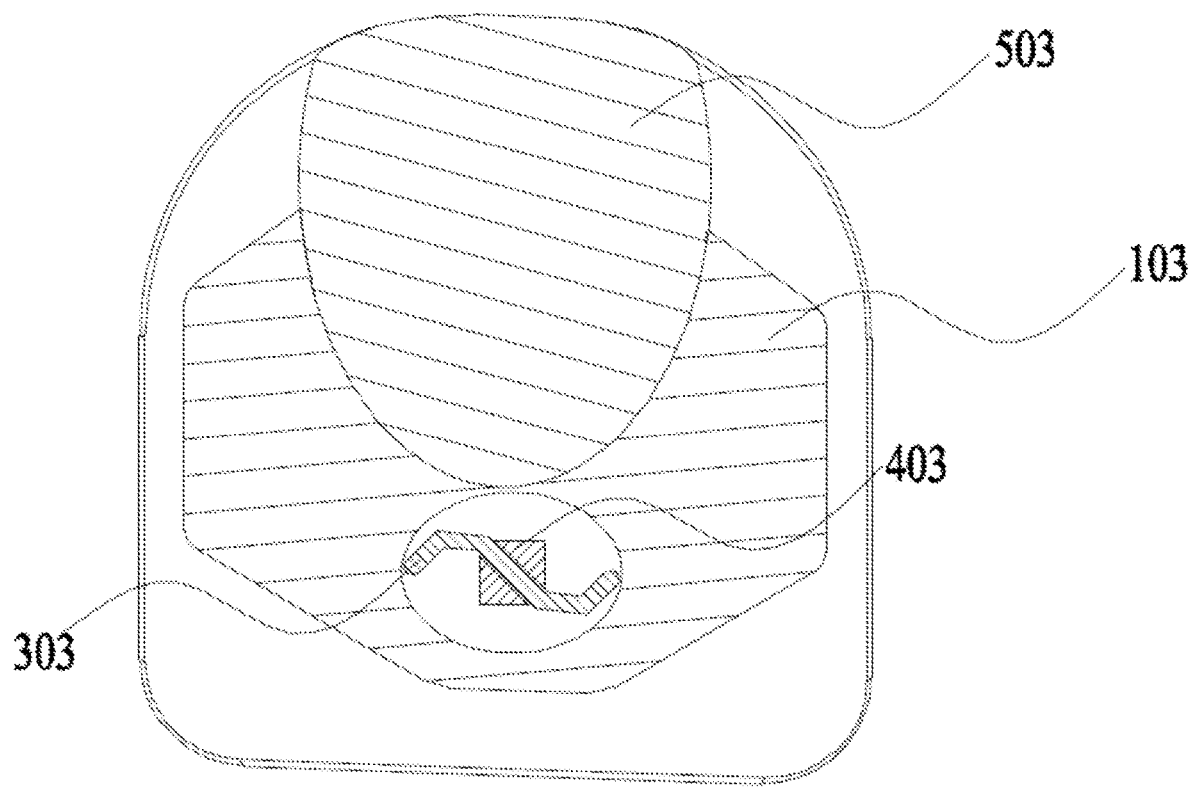
FIG. 16 is a rear view of the movable part when the orthodontic appliance is in the open position.

Referring to FIG. 15 to FIG. 16, FIG. 15 is a cross-sectional view of the orthodontic appliance in an open state taken along the section C-C in FIG. 10. FIG. 16 is a rear view of the movable part when the orthodontic appliance is in the open state. The protruding end 413 in FIG. 15 to FIG. 16 is rotated to the second position, the movable part 203 is movable relative to the main body 103, so as to arrive at the open position. When the movable part 203 is moved to the open position, the side wall of the accommodating cavity 223 may suppress the protruding end 413 from sliding out, thereby preventing the movable part 203 from sliding off the main body 103.

The present disclosure is not limited to the above-mentioned embodiments. If various changes or modifications of the present disclosure do not depart from the spirit and scope of the present disclosure, and if these changes and modifications comply with the claims of the present disclosure and the equivalent technical scope, then the present disclosure is also intended to include these changes and modifications.

To the claims:

1. An orthodontic appliance, comprising:
a main body comprising an archwire groove for accommodating an archwire; and
a movable part cooperating with the main body and movable between an open position and a closed position relative to the main body;
a fixing structure for fixing the movable part at least in the closed position, wherein the fixing structure comprises an elastic member and a movable element which are located in one of the main body and the movable part, the movable element comprises at least one protruding end, which is received in another of the main body and the movable part, the movable element is connected with the main body through a axis or an end of the movable element, the movable element is rotatable about the axis or the end of the movable element, the movable element is movable by squeezing the elastic member and cooperates with the elastic member to fix the movable part at least in the closed position.

2. The orthodontic appliance according to claim 1, wherein one of the movable part and the main body is provided with a blocking part, when the protruding end is in a first position, the blocking part abuts against the protruding end and suppresses the movable part from moving relative to the main body, or when the protruding end is in a second position, the movable part is movable relative to the main body.

3. The orthodontic appliance according to claim 2, wherein when the elastic member is not subject to any external force, the protruding end is located at the first position, and the movable element fixes the movable part in the closed position.

4. The orthodontic appliance according to claim 1, wherein the elastic member is retractable or expandable and cooperates with the movable element to fix the movable part at least in the closed position.

5. The orthodontic appliance according to claim 1, wherein the elastic member is bendable or straightened and cooperates with the movable element to fix the movable part at least in the closed position.

6. The orthodontic appliance according to claim 1, wherein the elastic member comprises at least one abutment wall that abuts against a side wall of the movable element.

7. The orthodontic appliance according to claim 1, wherein the movable element is provided with a hole into which the elastic member is inserted.

8. The orthodontic appliance according to claim 1, wherein the movable element is rotatable about the axis parallel to a labial lingual direction or a maxilla gingival direction.

9. The orthodontic appliance according to claim 1, wherein the fixing structure comprises the two elastic members located on either side of the movable element, and the elastic members are configured to provide the movable element with a moving space and a restoring force.

10. The orthodontic appliance according to claim 1, wherein the elastic member is any one of an "N" shape, an "M" shape, a "π" shape, a "[" shape, a "C" shape, an "S" shape, an "L" shape, a "T" shape, a "U" shape, an "H" shape, a linear shape, and a polyline shape on a cross section substantially parallel to a labial lingual direction or a maxilla gingival direction.

11. The orthodontic appliance according to claim 1, wherein the movable element is a plate or a pin, and the movable part is a locking slider.

12. The orthodontic appliance according to claim 1, wherein the one of the movable part and the main body is provided with an accommodating cavity on a surface facing the movable element, and the protruding end of the movable element is accommodated in the accommodating cavity.

* * * * *